(No Model.)
T. H. SEYMOUR.
HILLING PLOW.
No. 302,436. Patented July 22, 1884.
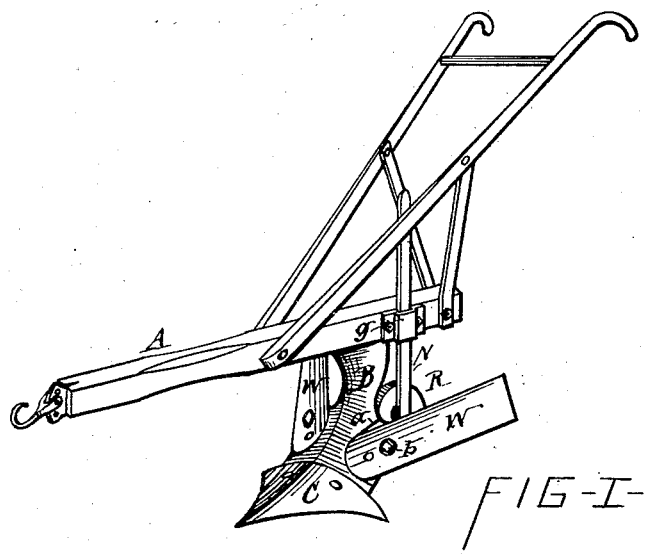
Fig-I-
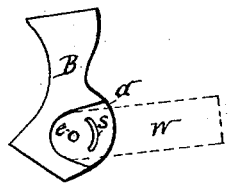
Fig-II-
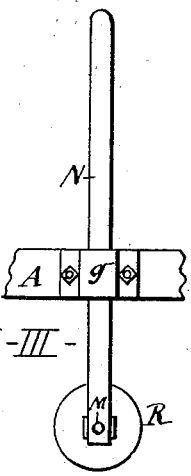
Fig-III-
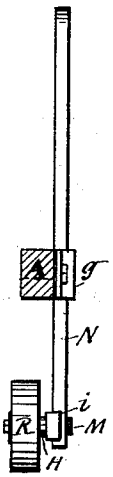
Fig-IV-
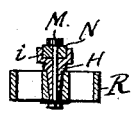
Fig-V-
WITNESSES
C. Bendixon
Wm. C. Raymond
INVENTOR
Timothy H. Seymour
per Duell, Lasset & Hey
his Attys

UNITED STATES PATENT OFFICE.

TIMOTHY H. SEYMOUR, OF ROME, NEW YORK, ASSIGNOR TO S. ADAMS & SON, OF SAME PLACE.

HILLING-PLOW.

SPECIFICATION forming part of Letters Patent No. 302,436, dated July 22, 1884.

Application filed March 25, 1884. (No model.)

*To all whom it may concern:*

Be it known that I, TIMOTHY H. SEYMOUR, of Rome, in the county of Oneida, in the State of New York, have invented new and useful Improvements in Hilling-Plows, of which the following, taken in connection with the accompanying drawings, is a full, clear, and exact description.

This invention relates to that class of plows which have wings adjustably extended from opposite sides thereof for the purpose of throwing the soil against the stalks of the plants set in wide rows; and the invention consists in the combination, with a single plow-beam, of a single standard provided at its lower end with a point or share, and formed above said point with flaring vertical cheeks, and wings pivoted on said cheeks and clamped adjustably in their position, which construction and combination of parts form a simple, compact, stout, and convenient plow, which admits of readily adjusting the wings so as to hill the soil around the plants in a most effectual manner, and without producing undue clogging or accumulation of the soil on the plow, and which, furthermore, allows the point of the plow to be attached and detached without interfering with the adjustment of said wings, all as hereinafter more fully described, and specifically set forth in the claim.

In the annexed drawings, Figure I is a perspective view of a plow embodying my improvement. Fig. II is a detail view of the attachment of the wings to the said plow. Figs. III and IV are respectively side and edge views of the gaging-roller, which is arranged between the wings of the plow; and Fig. V is a transverse section of said roller and its connection with its sustaining-arm.

Similar letters of reference indicate corresponding parts.

A denotes the plow-beam, B the standard, and C the point or share, of the plow. W' W'' represent wings distended from opposite sides of the plow for the purpose of throwing the soil against the stalks of the plants set in wide rows. Such wings have hitherto been hinged or pivoted either on the point of the plow or to extra hangers or standards, and in the first instance, whenever it became necessary to remove the point from the standard the wings had necessarily to be removed with the point, and in the other case, the wing-supports entailed an extra expense in the construction of the plow, and when it was desired to dispense with the wings their aforesaid extra support was an incumbrance to the plow. To obviate the aforesaid defects I attach the wings $w$ to the single standard B, above the point and independent thereof. The attachment I form by providing the standard with flaring vertical cheeks or bearings $a\,a$, which are integral with the standard, and project from opposite sides of the standard above the attachment of the point C, and are countersunk for the reception of the attaching end of the wing $w$, said attaching end being made semicircular, and provided with an eye coinciding with an eye, $e$, in the bearing $a$, for the reception of a bolt, forming the pivot on which the wing swings in a vertical or nearly vertical plane. The bearing $a$ is provided with a segmental slot, S, concentric with the eye $e$, and through the wing $w$ passes a bolt, $b$, which is extended through the slot S, and is provided with a clamping-nut for confining the wing in its desired position. The segmental slot S allows the wing $w$ to be lowered or raised to maintain a greater or less portion thereof in the soil, and thus throw more or less soil against the plant to be cultivated. By countersinking the wing $w$ in the standard B, as aforesaid, the accumulation of soil on the plow is obviated.

R designates a roller sustained between the wings $w$ by the arm N, which is adjustably clamped on the plow-beam by a clip, $g$, embracing said arm, and clamped onto the side of the plow-beam, as illustrated in Figs. I, III, and IV of the drawings, and sustaining the arm N central between the wings $w$. Thus by loosening the clip $g$ the standard can be raised or lowered, so as to cause the roller R to lift more or less of the rear portion of the plow. The connection of the roller R with its sustaining-arm N, I effect by means of a gudgeon, H, having a recessed bearing, $i$, by which it rests on the side of the arm. Said gudgeon is made tubular, and longitudinally through the same is extended a bolt, M, which passes through the arm N, and is provided with a clamping-nut on its end, by means of which nut the gudgeon is firmly clamped onto the aforesaid arm, the roller R being mounted on the gudgeon and retained thereon by a washer interposed between the hub of the roller and the head of the bolt. The aforesaid attachment is very simple, and admits of readily detaching the roller and gudgeon for repairs or renewal of the parts.

What I claim as my invention is—

In combination with the beam A, the single standard B, provided at its lower end with the point C, and having above said point flaring vertical cheeks $a$ $a$, projecting from opposite sides of the standard, and formed integral therewith, and the wings $w$, pivoted on said cheeks and clamped adjustably in their position, substantially as described and shown.

In testimony whereof I have hereunto signed my name and affixed my seal, in the presence of two attesting witnesses, at Rome, in the county of Oneida, in the State New York, this 8th day of March, 1884.

TIMOTHY H. SEYMOUR. [L. S.]

Witnesses:
 DAVID TULLOH,
 S. ADAMS, JR.